United States Patent [19]

Emery

[11] Patent Number: 5,099,867
[45] Date of Patent: Mar. 31, 1992

[54] SEALED VALVE AND CONTROL MEANS THEREFOR

[75] Inventor: James A. Emery, Stafford England

[73] Assignee: Marathon Oil Company, Findlay, Ohio

[21] Appl. No.: 638,228

[22] Filed: Jan. 7, 1991

[30] Foreign Application Priority Data

Oct. 4, 1990 [GB] United Kingdom ............... 9021557

[51] Int. Cl.⁵ .............................................. F16K 31/04
[52] U.S. Cl. ...................................... 137/1; 137/554;
251/129.11; 251/129.12; 251/129.05
[58] Field of Search .............. 251/129.11, 129.12,
251/129.13, 129.03, 129.05; 137/554, 1

[56] References Cited

U.S. PATENT DOCUMENTS

| | | |
|---|---|---|
| 3,206,160 | 9/1965 | Bennett . |
| 3,347,262 | 10/1967 | Gibson . |
| 3,387,748 | 6/1968 | Brenchley ................. 251/129.11 X |
| 3,561,724 | 2/1971 | Trombetta ..................... 251/129.03 |
| 4,021,015 | 5/1977 | Maeder et al. ................. 251/129.11 |
| 4,428,558 | 1/1984 | Odogaki . |
| 4,442,997 | 4/1984 | Idogaki et al. . |
| 4,546,338 | 10/1985 | Idogaki et al. . |
| 4,580,761 | 4/1986 | Silcox et al. . |
| 4,647,009 | 3/1987 | Idogaki et al. . |
| 4,735,233 | 4/1988 | Nogami et al. ............ 251/129.12 X |

FOREIGN PATENT DOCUMENTS 187180  10/1984  Japan .

Primary Examiner—Arnold Rosenthal
Attorney, Agent, or Firm—Jack L. Hummel; Jack E. Ebel

[57] ABSTRACT

A sealed valve body housing a rotary valve rotated by a spindle. The spindle is connected to a disc mounted in a chamber in the valve body adjacent a valve body wall. Polyphase drive coils on the valve body wall induce a current in the disc, causing it to rotate. A pulse sensor mounted on the valve body detects the rotative position of the disc and a counter signals the power source to stop movement of the valve. The periphery of the disc is notched to permit the pulses to pass through the rotating disc and be counted. The torque of the disc can be increased through use of more sets of coils, more discs or gears interconnecting the spindle and the rotary valve.

19 Claims, 2 Drawing Sheets

SEALED VALVE AND CONTROL MEANS THEREFOR

FIELD OF THE INVENTION

This invention relates to fluid valves, and more particularly, to a fluid valve which is operable from within a sealed valve body.

BACKGROUND OF THE INVENTION

Process valves in fluid flow lines are commonly operated by applying an external force to a spindle attached to the valve member. Because the spindle penetrates the valve body, a potential leakage path to the atmosphere is created. Although valve stem leakage is always sought to be minimized, leakage of some process fluids cannot be tolerated at all, as in the case of hazardous materials, fluids which are too valuable to lose in this manner and fluids which present unusually difficult maintenance problems when they escape.

Attempts to prevent valve stem leakage have been made in the past, resulting in various types of valve designs. In one type involving a sealed valve body, disclosed in U.S. Pat. No. 3,206,160, a ferromagnetic ball valve encased in a sealed housing is caused to move between open and closed positions by the magnetic fields produced by energizing coils which surround the housing. Although this arrangement provides a sealed valve, it suffers from other drawbacks. By limiting the ball to ferromagnetic material, the valve does not have applicability to environments in which the process fluid is hostile to the ball material. Further, the ball positioning technique is not as accurate as desired in view of the inevitable drift of the system due to heating of the coils and to the disclosed voltage divider arrangement.

Another example of a sealed valve is in U.S. Pat. No. 3,347,262, which discloses the use of a motor to rotate an outer cylindrically shaped magnet to cause rotation of an inner cylindrical magnet. Protuberances on a valve plug are contacted by the rotating inner magnet, causing the valve plug to open or close. This design does not have means for precisely positioning the valve plug, nor would the magnets be capable of developing the necessary torque required in many commercial process valve applications.

What is needed is an effective, reliable sealed valve that has no potential leaks to the atmosphere, which can deliver the high torque necessary in many process valve environments and which can be accurately controlled to position the valve at any predetermined point, whether fully open, fully closed or at an intermediate point between the two extremes.

BRIEF SUMMARY OF THE INVENTION

The invention is embodied in a sealed valve body containing a valve member adapted to be moved between open and closed positions. The valve member is connected to a disc rotatably mounted in the valve body. A polyphase electrical supply located externally of the valve body induces a current in the disc, thereby creating a torque that causes the disc to rotate. Means are provided for detecting the rotative position of the disc, and also for deenergizing the electrical supply means when the disc reaches a predetermined rotative position.

The means for detecting the rotative position of the disc, and hence the position of the connected valve member, preferably comprises a plurality of spaced portions on the disc which permit energy from a sensing device to pass through. In a preferred embodiment, this takes the form of cutouts or notches in the periphery of the disc, used in connection with a pulse sensor. A digital pulse counter connected to the electrical supply means is used in the preferred embodiment to deenergize the supply means. The disc in such an arrangement preferably is driven by drive coils of the polyphase electrical supply mounted on the opposite side of a valve body wall from the disc.

In a preferred arrangement the sealed valve is a rotary valve, with the rotating valve member connected directly to the rotatable disc.

The invention can be relied upon, due to its servomechanism control system, to accurately position the valve at any predetermined setting.

The above and other aspects of the invention, as well as other benefits, will readily be apparent from the more detailed description of the preferred embodiment which follows.

DETAILED DESCRIPTION OF THE PREFERRED EMBODIMENTS

Figure 1:
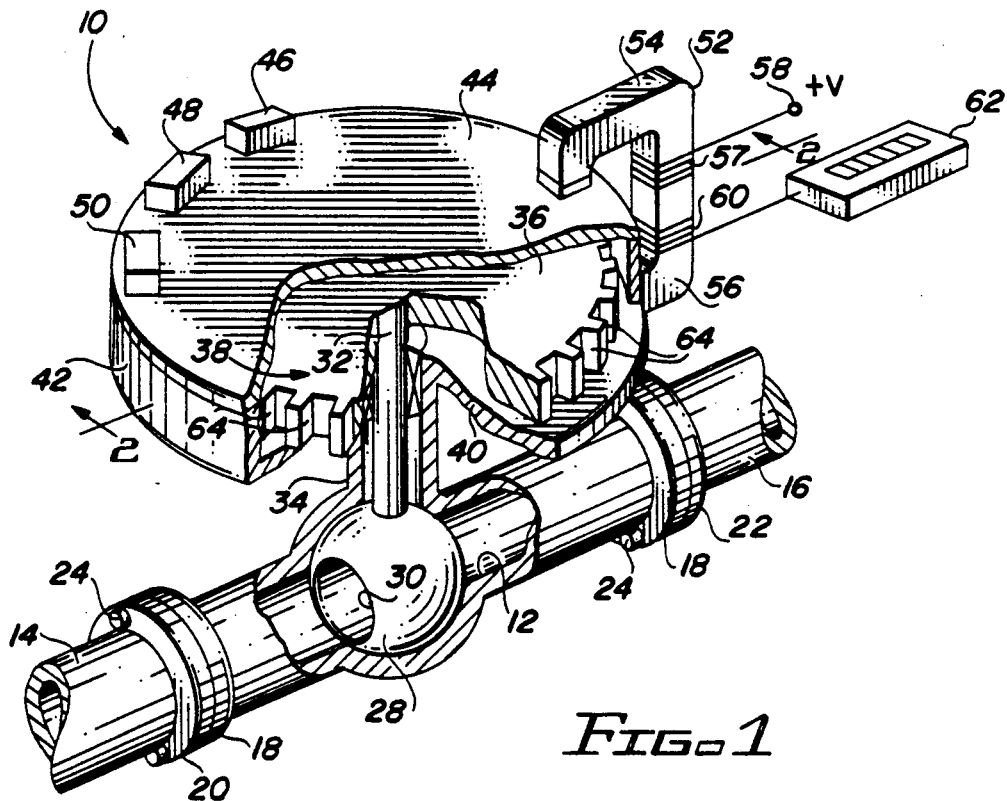
FIG. 1 is a pictorial view of the sealed valve of the invention, with portions of the valve body cut away to better show details of the valve.
Figure 2:
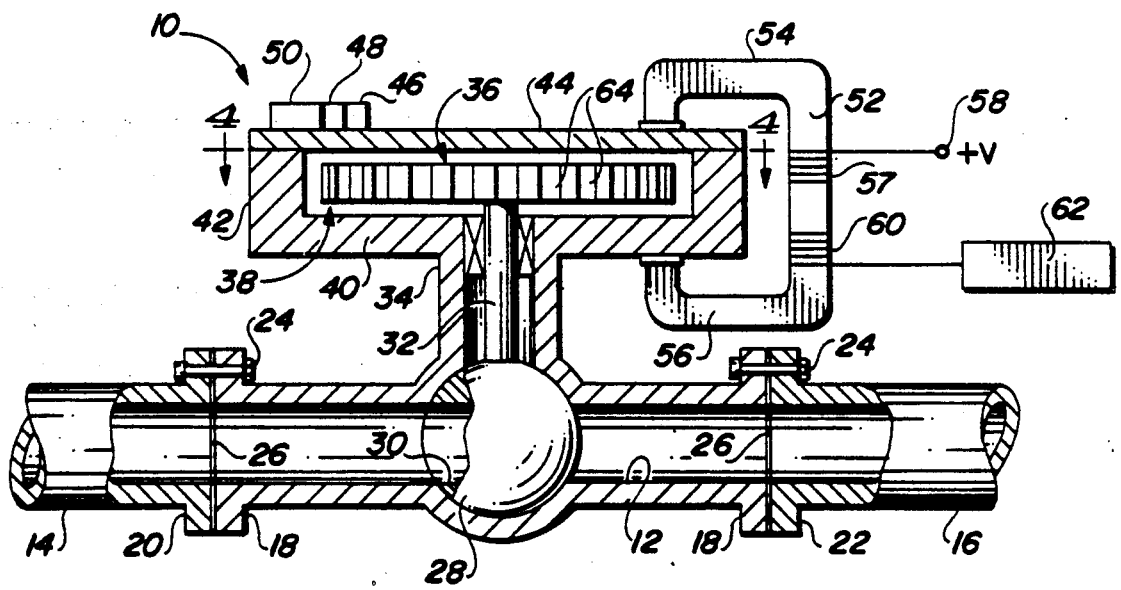
FIG. 2 is a longitudinal sectional view of the valve, taken on line 2—2 of FIG. 1.

Referring to FIGS. 1 and 2, a valve body 10 having a bore 12 extending therethrough is connected to conduits 14 and 16 so as to provide a flow path between the conduits. The valve body may be connected to the conduits in any preferred manner, as by connecting the flanges 18 of the valve body to the flanges 20 and 22 of the conduits by means of bolts 24. It will be understood that suitable seals 26 would be provided to prevent leakage at the connections.

The bore 12 is enlarged to receive the ball 28, which seats against the inner ends of the bore in the usual manner to prevent fluid flow around the ball. A bore 30 is provided in the ball 28 of the same diameter as the bore 12, so that when it is aligned with the bore 12, the bores 12 and 30 form a continuous flow path between the conduits 14 and 16. When the ball is turned so that the bore 30 is at right angles to the bores 12, the valve is in closed condition.

Connected to the ball 28 is a spindle 32 which extends up through a neck section 34 of the valve body 10. The other end of the spindle 32 is connected to a disc 36 situated in a chamber 38 defined by a circular lower wall portion 40 which extends radially outwardly from the neck section 34, a peripheral wall 42 extending up from the lower wall portion 40, and a circular upper wall comprised of plate 44. The spindle 32 and the disc 36 are spaced from the adjacent valve body structure so that they are free to rotate. It will be understood that the elements of the valve body will be designed to permit the valve body to be assembled and connected in any convenient way so that the interior of the housing is sealed from the atmosphere. Since the details of such connecting means are well known in the art and do not form a part of the present invention, they have not been illustrated.

Figure 3:
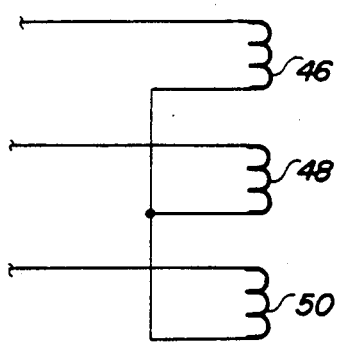
FIG. 3 is an electrical diagram of the drive coil arrangement.

Mounted on the top plate 44 are three coils 46, 48 and 50, which are electrically connected as shown in FIG. 3. The coils are connected to a suitable three-phase supply source, not shown, and when energized generate a magnetic flux which creates an induced current in the disc 36. This phenomenon, which can be likened to the operation of a polyphase linear motor, produces torque in the disc, causing the disc to rotate. Thus, by energizing the coils, the disc 36, the attached spindle 32 and the attached ball 28 will rotate.

Figure 4:
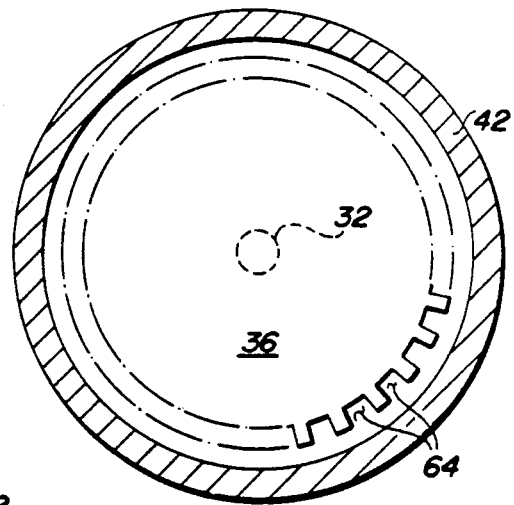
FIG. 4 is a transverse sectional view taken on line 4—4 of FIG. 2.

In order to stop the ball 28 at its open or closed position, a signal is sent to the electrical supply source to deenergize the coils, thus terminating the magnetic flux and stopping the rotation of the disc 36. In order to know when to send the signal, a pulse generator including a ferromagnetic core 52 mounted on the valve body by legs 54 and 56 is provided. A first coil 57 wound on the core is powered from a direct current supply 58, while a second coil 60, also wound on the core, is a "search" coil connected to a pulse counter 62. As best shown in FIGS. 1, 2 and 4, the periphery of the disc 36 is provided with regularly spaced cutouts or notches 64. The level of magnetic flux generated in the core 52 by the current in the powered coil 57 depends on the components of the magnetic circuit traversed by the flux. The "fixed" components are the core 52 itself and the metal of the valve body. The variable component is the gap through which the disc 36 rotates. The overall magnetic permeability of this gap varies depending on whether a cutout 64 of the disc is in this position or, alternatively, whether a solid portion of the disc is in this position. As the disc passes this particular point the magnetic circuit therefore has its permeability altered each time the edge of a cutout enters or leaves the magnetic circuit. The alteration in permeability causes a change in magnetic flux level in the magnetic circuit. In consequence, the search coil generates a pulse.

As the disc 36 rotates, a series of pulses will be transmitted to the pulse counter 62 from the search coil 60. In practice, when a predetermined number of pulses have been counted, the pulse counter sends an output signal to the three-phase power supply source to deenergize the drive coils and stop rotation of the disc 36. It will be appreciated that the number of notches or cutouts in the periphery of the disc between the fully open and fully closed positions of the valve can be programmed into the counter so that the signal to deenergize the drive coils is sent when that predetermined position has been reached.

Flow through the valve can be further controlled by positioning the valve at any desired intermediate position between the open and closed positions. This is possible because the system is in reality a closed loop servomechanism with a digital position feedback. The only limitation to the number of available positions of the valve intermediate its fully open and closed positions for a given accuracy of pulse counter is the number of cutouts in the edge of the disc. The number of cutouts can be maximized by making them of minimal width so that they are more in the nature of narrow slots.

The electronic hardware required by the invention is well known and readily available. It is solid state, has no moving parts, is of small size and can be totally encapsulated, making it highly reliable at minimal cost.

The speed of rotation of the disc, which governs the rate at which the valve can be moved, is generally proportional to the frequency of the supply voltage applied to the drive coils. If the normal mains frequency gives a speed which is too high or low, the coils can be supplied instead from a solid state frequency converter at whatever frequency best suits the requirement.

Although the invention is not limited to materials having specific and precise properties, they will of course have to possess certain magnetic and electrical properties. Thus, both the top of the valve body and the drive disc must be magnetic, while the disc must also be a conductor of electricity. Preferably, therefore, the disc should be comprised of a material which has high magnetic permeability and low electrical resistance, while the material of the plate on which the coils are mounted should have high electrical resistance and high magnetic permeability.

Figure 5:
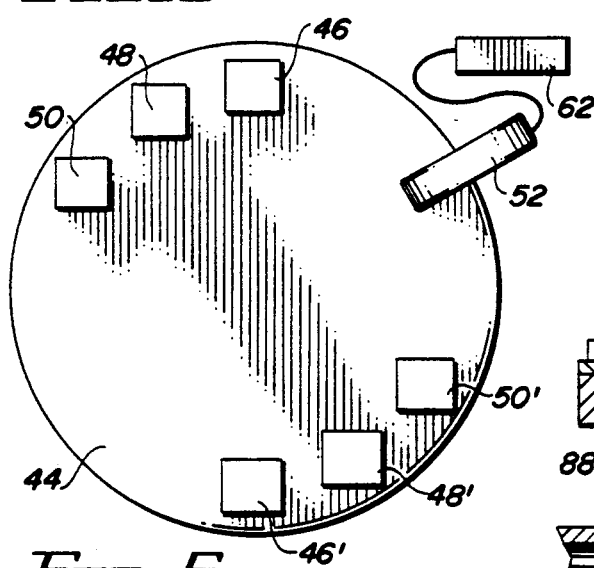
FIG. 5 is a top plan view of the valve body of a modified form of the invention.

For valve applications having high torque requirements, the torque provided by the arrangement described may have to be increased. This can be done by various means, one of which is illustrated in FIG. 5, wherein the plan view of a modified arrangement shows another set of drive coils 46,, 48, and 50, being provided in addition to the set comprised of coils 46, 48 and 50. Energization of both sets of coils would induce a greater current in the disc, resulting in greater torque. Both sets of coils may be connected to the same power source or, if preferred, to separate power sources. In either event, the pulse counter 62 would be connected to the power supply circuit so as to deenergize both sets of coils at the same time in order to properly control the positioning of the valve.

Figure 6:
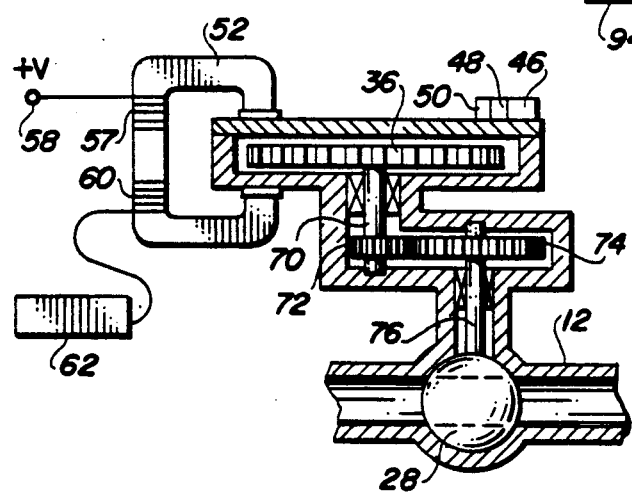
FIG. 6 is a longitudinal sectional view similar to that of FIG. 2, but showing another modified form of the invention.

Another way of multiplying the torque supplied by the rotating disc is through use of a suitable gear train. This is illustrated in FIG. 6, which shows the end of the shaft or stem 70 opposite the disc 36 carrying a rotary gear 72 of relatively small diameter. The gear 72 meshes with a relatively large rotary gear 74 connected to the spindle 76 of the ball 28. The torque in disc 36 induced by the drive coils 46, 48 and 50 is thus increased by the gear arrangement, enabling the ball 28 to be rotated in environments requiring greater torque. The valve housing would of course be formed so as to completely seal the valve mechanism from the atmosphere as in the first embodiment. It will be understood that the gear arrangement shown is for the purpose of illustration only, and that many different combinations of gears can be designed for use in multiplying and transferring the torque of the disc 36 to the valve spindle 76.

Figure 7:
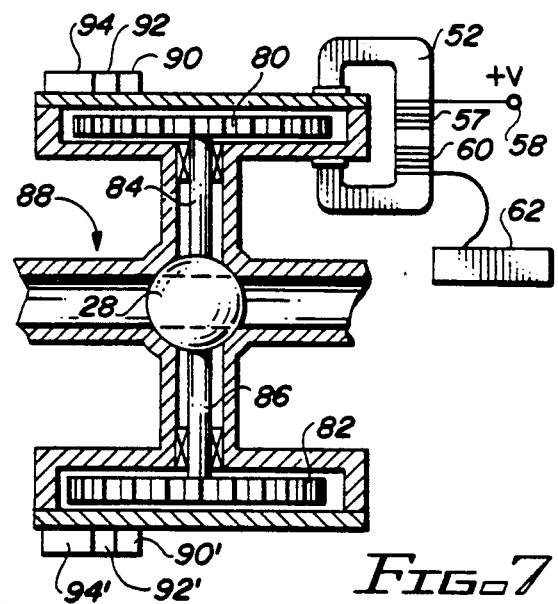
FIG. 7 is a longitudinal sectional view similar to that of FIG. 2, but showing a further modified form of the invention.

Another method of increasing the torque is illustrated in FIG. 7, wherein two discs 80 and 82 are connected to spindles 84 and 86, both of which are connected to opposite sides of the ball element 28. The valve body 88 is formed so as to have identical oppositely positioned chambers in which the discs 80 and 82 are mounted. A set of drive coils 90, 92 and 94 is provided on the housing opposite one of the discs 80 and another set comprised of coils 90,, 92, and 94, is provided on the housing opposite the other disc 82. Both sets of coils may be connected to the same power source or, if preferred, to separate power sources. In any event the counter 62 would be connected to the coil power supply circuits so as to deenergize both sets of coils at the same time in order to properly control the positioning of the valve. Only a single pulse generator 52 and a single associated counter 62 are necessary since both discs would be rotating in unison.

It will be obvious that other torque-increasing arrangements comprising various combinations of gears and additional drive coils may be designed if desired.

Although a ball valve has been shown as a preferred type of rotary valve, obviously other types, such as a rotary plug valve, can be employed as well.

It will now be appreciated that in accordance with the present invention the valve element in a sealed fluid valve can be caused to move by means of induced current, and can be accurately located at virtually any position between fully open and fully closed through a simple yet highly effective closed loop servomechanism system.

It should also be apparent that the invention is not necessarily limited to all the specific details described in connection with the preferred embodiments, but that changes to certain features which do not alter the overall basic function and concept of the invention may be made without departing from the spirit and scope of the invention, as defined in the claims.

What is claimed is:

1. A sealed valve, comprising:
   a valve body having a flow path connecting an inlet and an outlet, the entire valve body being sealed from the entire atmosphere;
   a movable valve member in the valve body adapted to be moved between open and closed positions;
   a disc in the valve body spaced from the valve member and mounted for rotation;
   polyphase electrical supply means external of the valve body for inducing a current in the disc, thereby creating torque in the disc and causing the disc to rotate;
   means connecting the disc to the valve member whereby rotation of the disc causes movement of the valve member;
   means for detecting the rotative position of the disc; and
   means for deenergizing the electrical supply means when the disc reaches a predetermined rotative position.

2. A sealed valve, comprising:
   a valve body having a flow path connecting an inlet and an outlet, the valve body being sealed form the atmosphere;
   a movable valve member in the valve body adapted to be moved between open and closed positions;
   a disc in the valve body spaced from the valve member and mounted for rotation;
   polyphase electrical supply means external of the valve body for inducing a current in the disc, thereby creating torque in the disc and causing the disc to rotate;
   means connecting the disc to the valve member whereby rotation of the disc causes movement of the valve member;
   means for detecting the rotative position of the disc, said detecting means comprising a plurality of uniformly spaced portions in the disc which permit passage therethrough of energy from a sensing device; and
   means for deenergizing the electrical supply means when the disc reaches a predetermined rotative position.

3. The sealed valve of claim 2, wherein the portions of the disc permitting the passage of energy therethrough comprise spaced openings in the periphery of the disc.

4. The sealed valve of claim 2, wherein the sensing device comprises a pulse sensor.

5. The sealed valve of claim 4, wherein the means for deenergizing the electrical supply means when the disc reaches a predetermined rotative position comprises a pulse counter connected to the pulse sensor and to the electrical supply means, the pulse counter being capable of deenergizing the electrical supply means when a predetermined number of pulses have been registered.

6. The sealed valve of claim 1, wherein the disc is mounted in a chamber in the valve body between the valve member and an outer wall of the valve body, and wherein the polyphase electrical supply means includes drive coils mounted on the exterior face of said outer wall.

7. The sealed valve of claim 6, wherein said valve body wall is formed from material possessing high electrical resistance and high magnetic permeability, and the disc is formed from material possessing low electrical resistance and high magnetic permeability.

8. The sealed valve of claim 6, wherein the polyphase electrical supply means comprises three drive coils for supplying three-phase power.

9. The sealed valve of claim 6, wherein the drive coils comprise a plurality of sets of polyphase coils.

10. The sealed valve of claim 6, including a second disc mounted in a second chamber in the valve body between the valve member and a second outer wall of the valve body, the second disc also being connected to the valve member, additional polyphase drive coils being mounted on the exterior face of the second outer wall to cause the second disc to rotate.

11. The sealed valve of claim 6, wherein the means connecting the disc to the valve member includes gear means for multiplying the torque of the rotating disc.

12. The sealed valve of claim 1, wherein the valve member is a rotary valve member and the means connecting the disc to the rotary valve member comprises a spindle.

13. The sealed valve of claim 12, wherein the rotary valve member is a ball valve.

14. The sealed valve of claim 12, wherein the rotary valve member is comprised of non-magnetic material.

15. The sealed valve of claim 4, wherein the disc is mounted in a chamber in the valve body between two valve body walls which are substantially parallel to the disc, the pulse sensor having pulse generating means associated with one of the walls and pulse detecting means associated with the other wall, the pulse generating means and the pulse detecting means being aligned with each other and with said spaced portions in the disc.

16. A method of moving and positioning a movable valve member positioned within a valve body which is entirely sealed from the atmosphere, comprising the steps of:
   rotating a disc positioned entirely within the sealed valve body and connected to the valve member by inducing a current in the disc from a polyphase electrical supply means located externally of the valve body;

determining the position of the valve member by detecting the rotative position of the disc; and deenergizing the electrical supply means when the disc reaches a predetermined rotative position.

17. The method of claim 16, wherein current is induced in the disc by means of drive coils of a three-phase supply, the drive coils being mounted on an external wall of the valve body.

18. A method of moving and positioning a movable valve member in a sealed valve body, comprising the steps of:

rotating a disc connected to the valve member by inducing a current in the disc from a polyphase electrical supply means located externally of the valve body;

detecting the rotative position of the disc and thereby determining the position of the valve member by providing a plurality of uniformly spaced openings in the periphery of the disc, sending energy through the openings and detecting the pulses of energy passing through the openings with pulse sensing means; and deenergizing the electrical supply means when the disc reaches a predetermined rotative position.

19. The method of claim 18, wherein the electrical supply means is denergized by counting the number of pulses detected by the sensing means and deenergizing the electrical supply means when a predetermined number of pulses have been sensed.

* * * * *

UNITED STATES PATENT AND TRADEMARK OFFICE
CERTIFICATE OF CORRECTION

PATENT NO. : 5,099,867
DATED : March 31, 1992
INVENTOR(S) : James A. Emery It is certified that error appears in the above-identified patent and that said Letters Patent is hereby corrected as shown below:

Col. 5, line 32:      Before "atmosphere", delete --entire--.
Col. 5, line 51:      Delete "form" and insert therefor --from--.

Signed and Sealed this

Twenty-second Day of June, 1993

Attest:

MICHAEL K. KIRK

*Attesting Officer*      Acting Commissioner of Patents and Trademarks